(12) United States Patent
Morris

(10) Patent No.: US 8,745,418 B2
(45) Date of Patent: Jun. 3, 2014

(54) METHODS, SYSTEMS, AND COMPUTER PROGRAM PRODUCTS FOR SELECTING A RESOURCE BASED ON A MEASURE OF A PROCESSING COST

(75) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 347 days.

(21) Appl. No.: 12/857,851

(22) Filed: Aug. 17, 2010

(65) Prior Publication Data
US 2012/0047512 A1 Feb. 23, 2012

(51) Int. Cl.
 G06F 1/00 (2006.01)
 G05B 13/02 (2006.01)
 G01R 15/00 (2006.01)
 G06F 11/30 (2006.01)

(52) U.S. Cl.
 USPC ............... 713/300; 700/36; 702/57; 702/182

(58) Field of Classification Search
 USPC .................. 713/300; 700/36; 702/57, 182
 See application file for complete search history.

(56) References Cited

U.S. PATENT DOCUMENTS

| 7,242,920 | B2 | 7/2007 | Morris |
| 7,941,427 | B2 * | 5/2011 | Barsness et al. ............ 707/720 |
| 8,131,843 | B2 * | 3/2012 | Yellin et al. ................ 709/224 |
| 2007/0211743 | A1 * | 9/2007 | Zwernemann et al. ....... 370/431 |
| 2008/0263375 | A1 | 10/2008 | Sundstrom |
| 2010/0010857 | A1 * | 1/2010 | Fadell .............................. 705/8 |
| 2010/0157821 | A1 | 6/2010 | Morris |

OTHER PUBLICATIONS

Kim et al., Energy-Aware Resource Allocation in WLAN Mobile Devices, 2005, IEEE Globecom 2005.
Bunse et al., Choosing the "Best" Sorting Algorithm for Optimal Energy Consumption, 2009, International University in Germany.

* cited by examiner

Primary Examiner — Stefan Stoynov
(74) Attorney, Agent, or Firm — Patrick E. Caldwell, Esq.; The Caldwell Firm, LLC

(57) ABSTRACT

Methods and systems are described for selecting a resource based on a measure of a processing cost. Resource information is received identifying a first resource and a second resource for processing by a program component. One or more of a first measure of a specified processing cost for the processing of the first resource and a second measure of the processing cost for the processing of the second resource is determined. One of the first resource and the second resource is selected based on at least one of the first measure and the second measure. The selected one of the first resource and the second resource is identified to the program component for processing.

20 Claims, 9 Drawing Sheets

METHODS, SYSTEMS, AND COMPUTER PROGRAM PRODUCTS FOR SELECTING A RESOURCE BASED ON A MEASURE OF A PROCESSING COST

RELATED APPLICATIONS

This application is related to the following commonly owned, pending U.S. patent applications, the entire disclosure of each being incorporated by reference herein: application Ser. No. 12/857,847 filed on 2010 Aug. 17, entitled "Methods, Systems, and Program Products for Presenting an Indication of a Cost of Processing a Resource";

application Ser. No. 12/857,857, filed on 2010 Aug. 17, entitled "Methods, Systems, and Program Products for Selecting a Resource in Response to a Change in Available Energy"; and application Ser. No. 12/857,836, filed on 2010 Aug. 17, entitled "Methods, Systems, and Program Products for Maintaining a Resource Based on a Cost of Energy".

BACKGROUND

Many personalization options on computing devices consume energy not required to perform computing tasks. For example, a primary purpose of a desktop background is esthetic. Mouse pointer effects, window effects, document previews, and many other examples exist. Currently, a user can configure a device to automatically turn such features on or off based on whether the device is plugged into an electrical outlet or drawing energy from a battery. Other features, such as the brightness of a display, can be adjusted based on whether a device is plugged in or not. These configuration options give no consideration to resources being processed by the corresponding features.

Accordingly, there exists a need for methods, systems, and computer program products for selecting a resource based on a measure of a processing cost.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for selecting a resource based on a measure of a processing cost. In one aspect, the method includes receiving resource information identifying a first resource and a second resource for processing by a program component. The method further includes determining at least one of a first measure of a specified processing cost for the processing of the first resource and a second measure of the processing cost for the processing of the second resource. The method still further includes selecting one of the first resource and the second resource based on the at least one of the first measure and the second measure. The method still further includes identifying, to the program component, the selected one of the first resource and the second resource for processing.

Further, a system for selecting a resource based on a measure of a processing cost is described. The system includes a cost advisor component, a cost monitor component, a cost director component, and a cost operations component adapted for operation in an execution environment. The system includes the cost advisor component configured for receiving resource information identifying a first resource and a second resource for processing by a program component. The system further includes the cost monitor component configured for determining at least one of a first measure of a specified processing cost for the processing of the first resource and a second measure of the processing cost for the processing of the second resource. The system still further includes the cost director component configured for selecting one of the first resource and the second resource based on the at least one of the first measure and the second measure. The system still further includes the cost operations component configured for identifying, to the program component, the selected one of the first resource and the second resource for processing.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
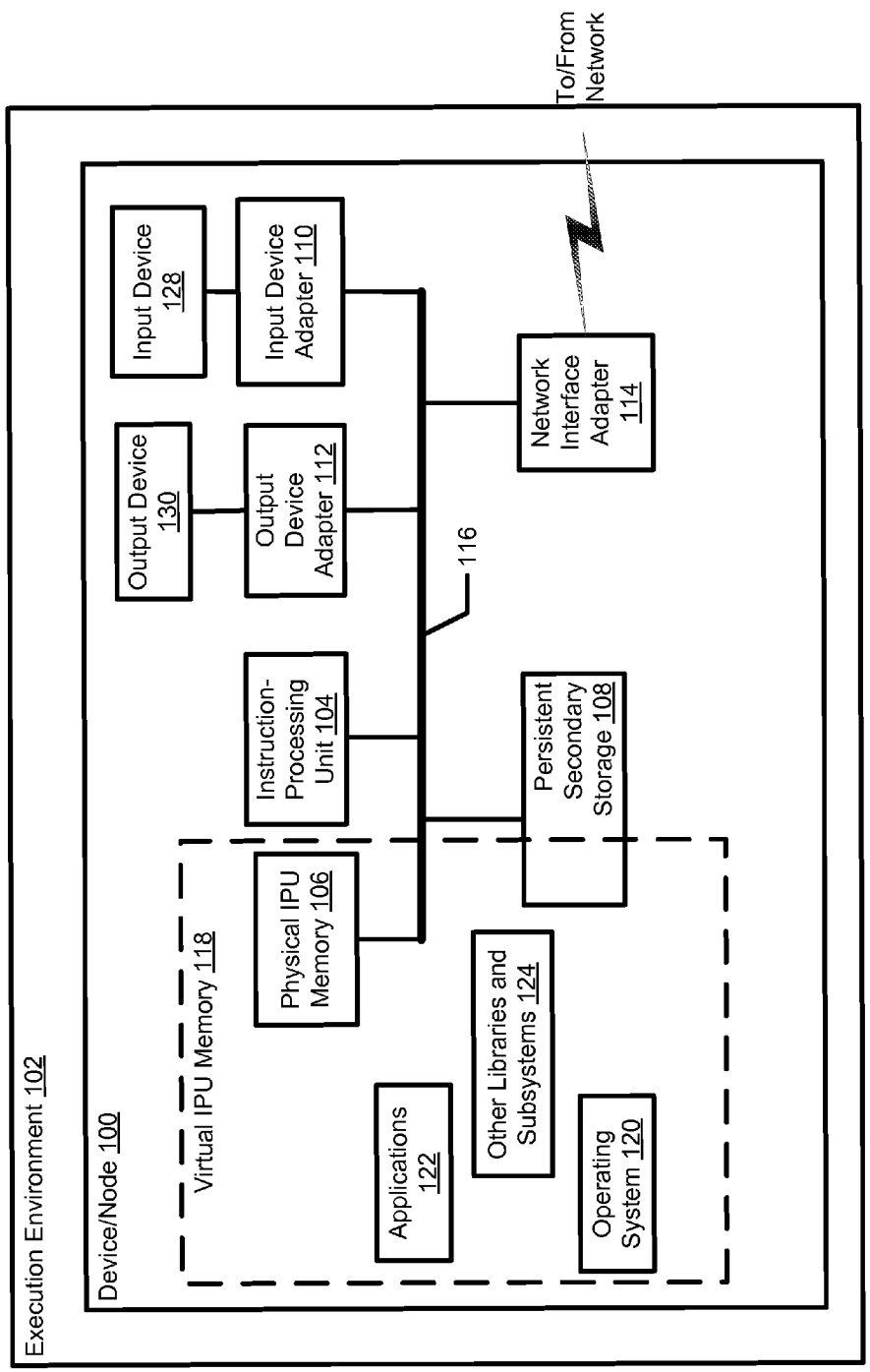
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in or otherwise providing suitable execution environments for configuring according to the subject matter include personal computers, notebook computers, tablet computers, servers, handheld and other mobile devices, multiprocessor devices, distributed devices, consumer electronic devices, routers, communication servers, and/or other network-enabled devices. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display and/or an audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual processor memory is referred to as a virtual memory address space; its addresses are referred to as virtual memory addresses; and its IPU memory is referred to as a virtual IPU memory or virtual memory. The terms "IPU memory" and "processor memory" are used interchangeably herein. Processor memory may refer to physical processor memory, such as IPU memory 106, and/or may refer to virtual processor memory, such as virtual IPU memory 118, depending on the context in which the term is used.

Physical IPU memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical IPU memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include removable media. The drives and their associated computer readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms "communication interface component" and "network interface component" are used interchangeably. FIG. 1 illustrates network interface adapter (NIA) 114 as a network interface component included in execution environment 102 to operatively couple device 100 to a network. A network interface component includes a network interface hardware (NIH) component and optionally a software component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

The components of a user interface are generically referred to herein as "user interface elements". More specifically, visual components of a user interface are referred to herein as "visual interface elements". A visual interface element may be a visual component of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual component", and "visual interface element" are used interchangeably in this document. Other types of user interface elements include audio output components referred to as "audio interface elements", tactile output components referred to as "tactile interface elements", and the like.

A "user interface (UI) element handler" component, as the term is used in this document, includes a component configured to send information representing a program entity for presenting a user detectable representation of the program entity by an output device, such as a display. A "program entity" is an object included in and/or otherwise processed by an application or executable. The user detectable representation is presented based on the sent information. The sent information is referred to herein as "presentation information". Presentation information may include data in one or more formats. Exemplary formats include image formats such as JPEG, video formats such as MP4, markup language data such as HTML and other XML-based markup, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface elements, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in processor memory, secondary storage, a memory of an output adapter device, and/or a storage medium of an output device. A screen of a display, for example, is a presentation space.

As used herein, the term "program" or "executable" refers to any data representation that may be translated into a set of machine code instructions and optionally associated program data. Thus, a program or executable may include an application, a shared or non-shared library, and a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition can include machine code and virtual machine code, such as Java™ byte code.

As used herein, an "addressable entity" is a portion of a program, specifiable in programming language in source code. An addressable entity is addressable in a program component translated for a compatible execution environment from the source code. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate languages for processing by an interpreter, compiler, linker, loader, or analogous tool.

Figure 2:
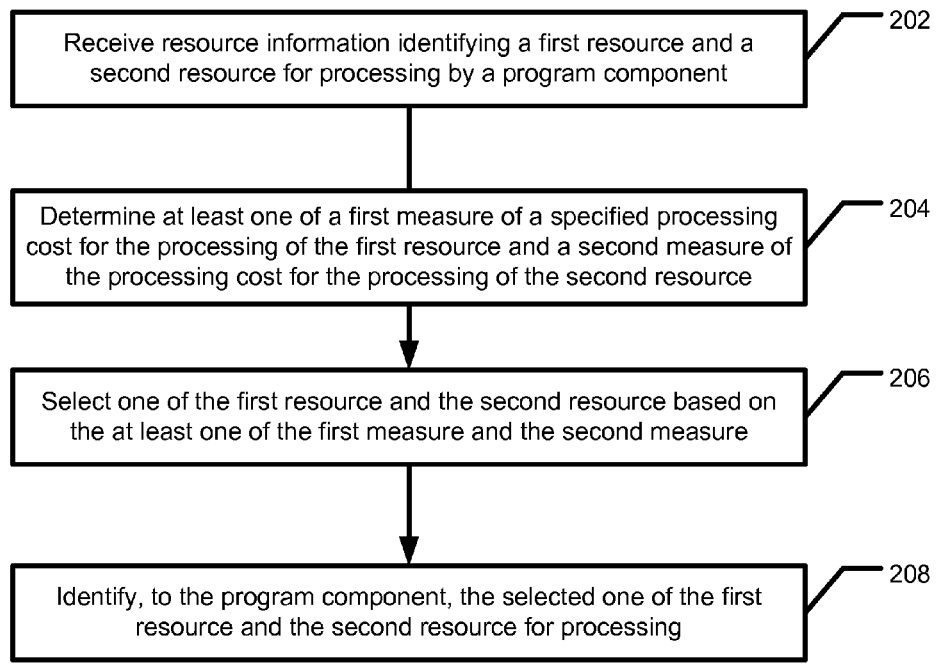
FIG. 2 is a flow diagram illustrating a method for selecting a resource based on a measure of a processing cost according to an aspect of the subject matter described herein.
Figure 3:
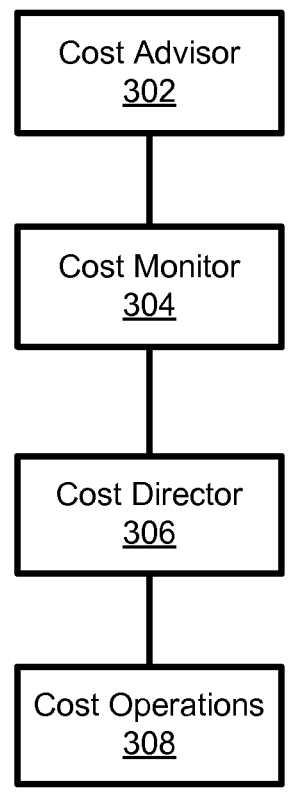
FIG. 3 is a block diagram illustrating an arrangement of components for selecting a resource based on a measure of a processing cost according to another aspect of the subject matter described herein.

The block diagram in FIG. 3 illustrates an exemplary system for selecting a resource based on a measure of a processing cost according to the method illustrated in FIG. 2. FIG. 3 illustrates a system, adapted for operation in an execution environment, such as execution environment 102 in FIG. 1, for performing the method illustrated in FIG. 2. The system illustrated includes a cost advisor component 302, a cost monitor component 304, a cost director component 306, and a cost operations component 308. The execution environment includes an instruction-processing unit, such as IPU 104, for processing an instruction in at least one of the cost advisor component 302, the cost monitor component 304, the cost director component 306, and the cost operations component 308. Some or all of the exemplary components illustrated in FIG. 3 may be adapted for performing the method illustrated in FIG. 2 in a number of execution environments. FIGS. 4a-d include block diagrams illustrating the components of FIG. 3 and/or analogs of the components of FIG. 3 adapted for operation in various execution environments 401 including or otherwise provided by one or more nodes.

FIG. 1 illustrates components of an exemplary device that may at least partially provide and/or otherwise be included in an execution environment. The components illustrated in FIGS. 4a-d may be included in or otherwise combined with the components of FIG. 1 to create a variety of arrangements of components according to the subject matter described herein.

Figure 4A:
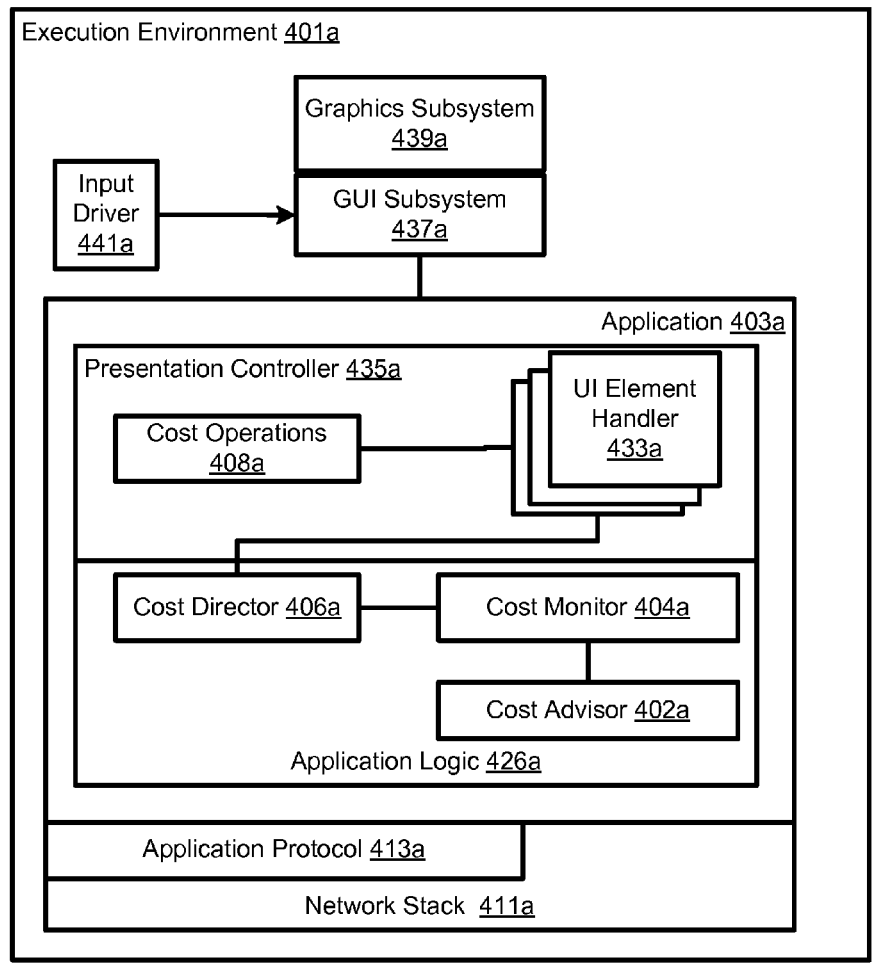
FIG. 4a is a block diagram illustrating an arrangement of components for selecting a resource based on a measure of a processing cost according to another aspect of the subject matter described herein.
Figure 4B:
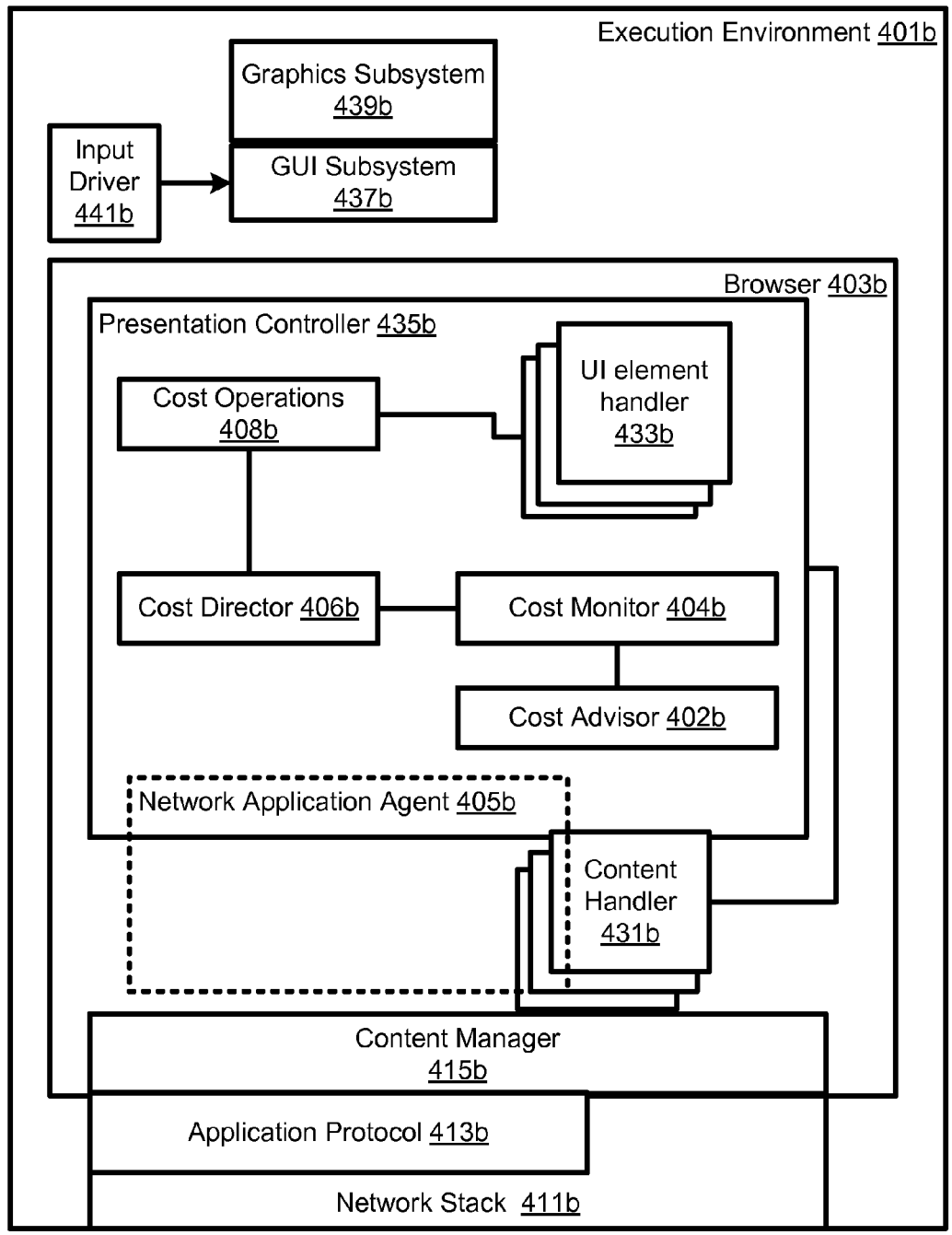
FIG. 4b is a block diagram illustrating an arrangement of components for selecting a resource based on a measure of a processing cost according to another aspect of the subject matter described herein.
Figure 4C:
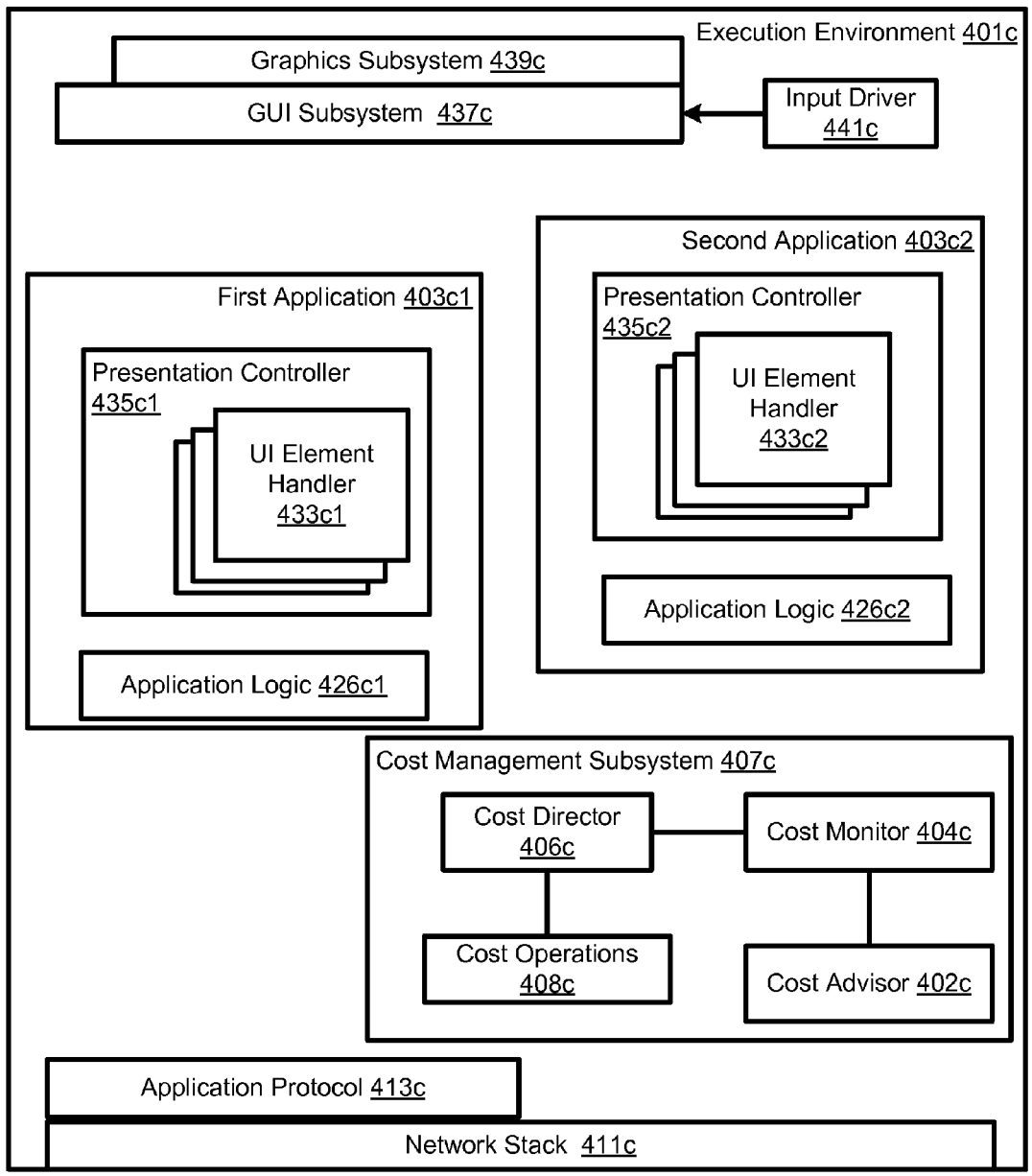
FIG. 4c is a block diagram illustrating an arrangement of components for selecting a resource based on a measure of a processing cost according to another aspect of the subject matter described herein.
Figure 4D:
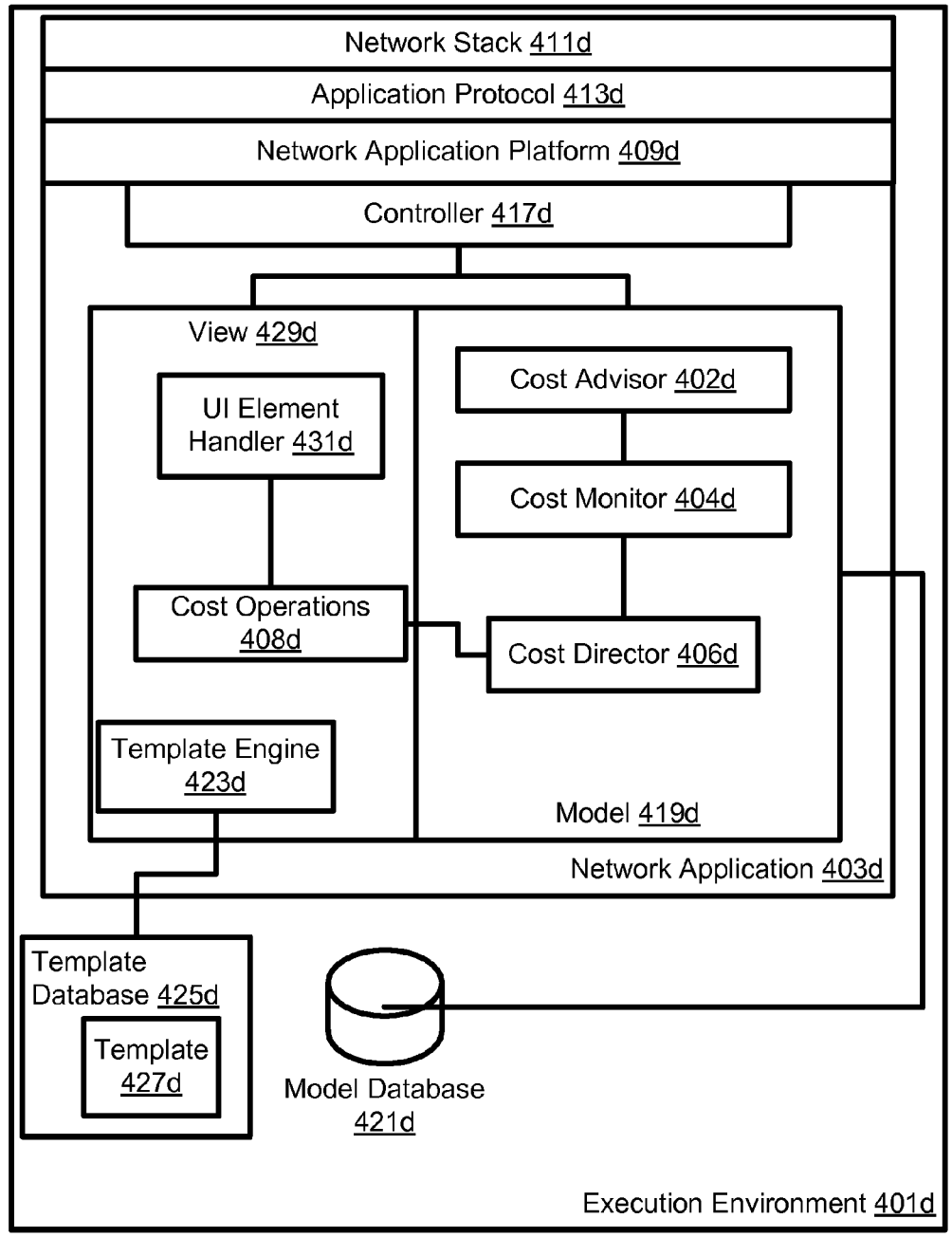
FIG. 4d is a block diagram illustrating an arrangement of components for selecting a resource based on a measure of a processing cost according to another aspect of the subject matter described herein.
Figure 5:
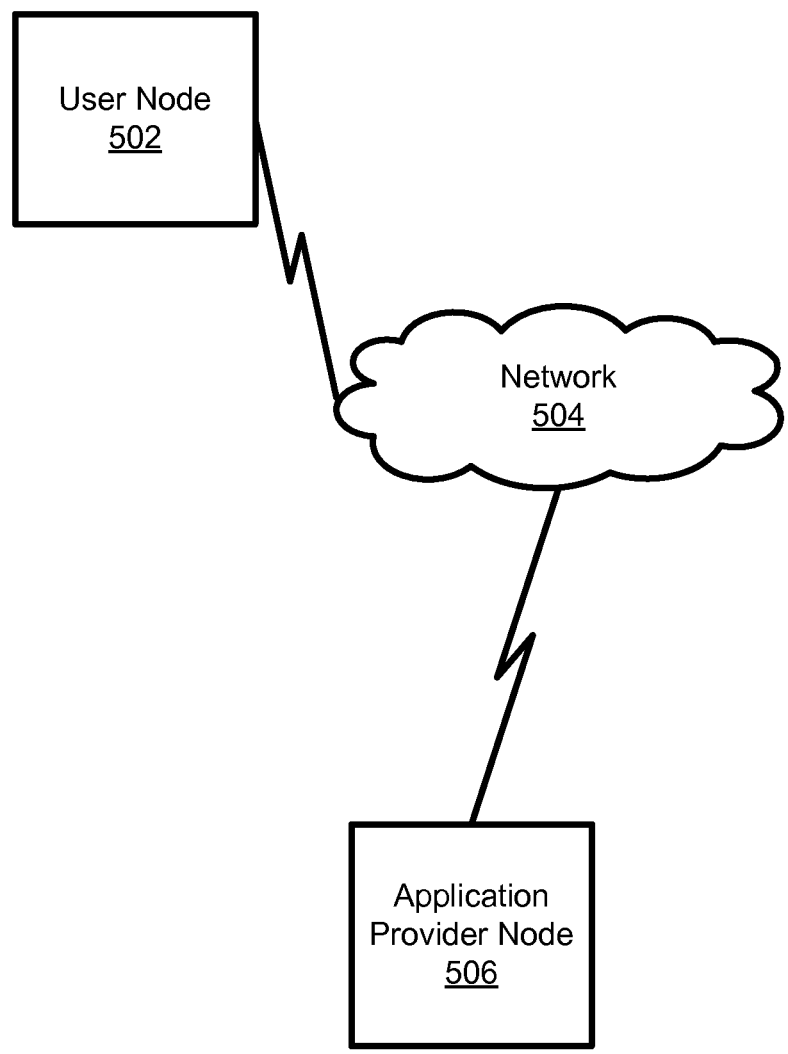
FIG. 5 is a network diagram illustrating an exemplary system for selecting a resource based on a measure of a processing cost according to another aspect of the subject matter described herein.

FIG. 5 illustrates user node 502 as an exemplary device that in various aspects may be included in and/or otherwise adapted for providing any of execution environments 401 illustrated in FIGS. 4a-c each illustrating a different adaptation of the arrangement of components in FIG. 3. As illustrated in FIG. 5, user node 502 is operatively coupled to network 504 via a network interface component, such as network interface adapter 114. Alternatively or additionally, an adaptation of an execution environment 401 may include and/or may otherwise be provided by a device that is not operatively coupled to a network. A server device is illustrated by application provider node 506. Application provider node 506 may be included in and/or otherwise adapted for providing execution environment 401d illustrated in FIG. 4d. As illustrated in FIG. 5, application provider node 506 is operatively coupled to network 504 via a network interface component included in execution environment 401d.

FIG. 4a illustrates execution environment 401a hosting application 403a including an adaptation of the arrangement of components in FIG. 3. FIG. 4b illustrates execution environment 401b hosting browser 403b including an adaptation of the arrangement of components in FIG. 3 that may operate at least partially in a network application agent 405b received from a remote application provider, such as network application 403d in FIG. 4d. Browser 403b and execution environment 401b may provide at least part of an execution environment for network application agent 405b that may be received via a network from a network application operating in a remote execution environment. FIG. 4c illustrates an arrangement of the components in FIG. 3 adapted to operate in a cost management subsystem 407c of execution environment 401c. The arrangement in FIG. 4c may mediate communication between applications 403c and one or more output devices, such as output device 130 in FIG. 1.

FIG. 4d illustrates execution environment 401d configured to host one or more network applications, such as a web service, illustrated by network application 403d. FIG. 4d also illustrates network application platform 409d that may provide services to one or more network applications. Network application 403d includes yet another adaptation of the arrangement of components in FIG. 3.

The various adaptations of the arrangement in FIG. 3 that are described herein are not exhaustive. For example, those skilled in the art will see based on the description herein that arrangements of components for performing the method illustrated in FIG. 2 may be at least partially included in an application and at least partially external to the application. Further, arrangements for performing the method illustrated in FIG. 2 may be distributed across more than one node and/or execution environment. For example, such an arrangement may operate at least partially in browser 403b in FIG. 4b and at least partially in execution environment 401d in and/or external to network application 403d.

FIGS. 4a-d illustrate adaptations of network stacks 411 configured for sending and receiving messages over a network, such as network 504, via a network interface component. Network application platform 409d in FIG. 4d provides services to one or more network applications. In various aspects, network application platform 409d may include and/or interoperate with a web server. FIG. 4d also illustrates network application platform 409d configured for interoperating with network stack 411d.

Network stacks 411 may support the same protocol suite, such as TCP/IP, or may communicate via a network gateway or other protocol translation device and/or service. For example, browser 403b in FIG. 4b and network application platform 409d in FIG. 4d may interoperate via their respective network stacks: network stack 411b and network stack 411d.

FIGS. 4a-d illustrate applications 403, respectively, which may communicate via one or more application layer protocols. FIGS. 4a-d respectively illustrate application protocol components 413 for communicating via one or more application layer protocols. Exemplary application protocols include hypertext transfer protocol (HTTP) and instant messaging and presence (XMPP-IM) protocol. Matching protocols enabling applications 403 to communicate via network 504 in FIG. 5 are not required, if communication is via a protocol gateway or other translator.

In FIG. 4b, browser 403b may receive some or all of network application agent 405b in one or more messages sent from a network application, such as network application 403d via network application platform 409d, a network stack 411, a network interface component, and optionally an application protocol component 413. In FIG. 4b, browser 403b includes content manager component 415b. Content manager component 415b may interoperate with one or more of application protocol components 413b and/or network stack 411b to receive the message or messages including some or all of network application agent 405b.

Network application agent 405*b* may include a web page for presenting a user interface for network application 403*d*. The web page may include and/or reference data represented in one or more formats including hypertext markup language (HTML) and/or other markup language, ECMAScript or other scripting language, byte code, image data, audio data, and/or machine code.

In an example, in response to a request received from browser 403*b*, controller component 417*d*, in FIG. 4*d*, may invoke model subsystem 419*d* to perform request-specific processing. Model subsystem 419*d* may include any number of request handlers (not shown) for dynamically generating data and/or retrieving data from model database 421*d* based on the request. Controller component 417*d* may further invoke template engine 423*d* to identify one or more templates and/or static data elements for generating a user interface for representing a response to the received request. FIG. 4*d* illustrates template database 425*d* including exemplary template 427*d*. FIG. 4*d* illustrates template engine 423*d* as a component in view subsystem 429*d* configured to return responses to processed requests in a presentation format suitable for a client, such as browser 403*b*. View subsystem 429*d* may provide the presentation data to controller component 417*d* to send to browser 403*b* in response to the request received from browser 403*b*. Some or all of network application agent 405*b* may be sent to browser 403*b* via network application platform 409*d* as described above.

While the example describes sending some or all of network application agent 405*b* in response to a request, network application 403*d* additionally or alternatively may send some or all of a network application agent to browser 403*b* via one or more asynchronous messages. In an aspect, an asynchronous message may be sent in response to a change detected by network application 403*d*. Publish-subscribe protocols, such as the presence protocol specified by XMPP-IM, are exemplary protocols for sending messages asynchronously.

The one or more messages including information representing some or all of network application agent 405*b* in FIG. 4*b* may be received by content manager component 415*b* via one or more of application protocol component(s) 413*b* and network stack 411*b* as described above. In FIG. 4*b*, browser 403*b* includes one or more content handler components 431*b* to process received data according to its data type, typically identified by a MIME-type identifier. Exemplary content handler components 431*b* include a text/html content handler component for processing HTML documents; an application/xmpp-xml content handler component for processing XMPP streams including presence tuples, instant messages, and publish-subscribe data as defined by various XMPP specifications; one or more video content handler components for processing video streams of various types; and still image data content handler components for processing various images types. Content handler components 431*b* process received data and may provide a representation of the processed data to one or more user interface (UI) element handler components 433*b*.

UI element handler components 433 are respectively illustrated in presentation controller components 435 in FIG. 4*a*, FIG. 4*b*, and FIG. 4*c*. A presentation controller component 435 may manage visual, audio, and/or other types of output of its including application 403 as well as receive and route detected user and other inputs to components and extensions of its including application 403. With respect to FIG. 4*b*, a UI element handler component 433*b* in various aspects may be adapted to operate at least partially in a content handler component 431*b* such as a text/html content handler component and/or a script content handler component. Additionally or alternatively, a UI element handler component 433 in an execution environment 401 may operate in and/or as an extension of its including application 403. For example, a plug-in may provide a virtual machine, for a UI element handler component received as a script and/or byte code, that may operate as an extension in application 403 and/or external to and interoperating with application 403.

Figure 6:
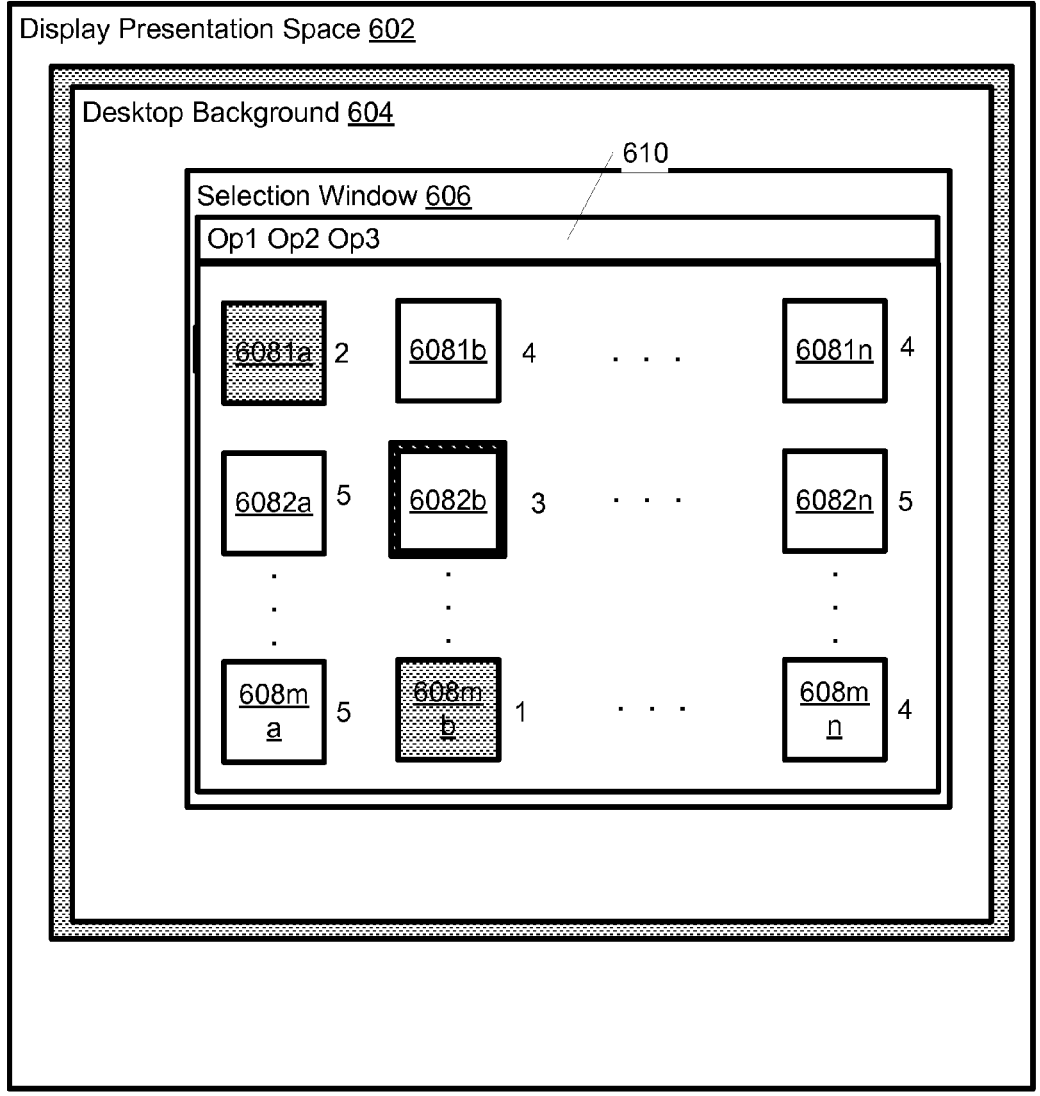
FIG. 6 is a diagram illustrating a user interface presented via a display according to another aspect of the subject matter described herein.

FIG. 6 illustrates display presentation space 602 of a display in and/or operatively coupled to user node 502. FIG. 6 illustrates desktop background 604 that may be a still image and/or a video background. Selection window 606 is illustrated including selectable resource icons 608. In an aspect, a resource icon may represent image and/or video data. Resource icon 6082*b* is illustrated as selected. A selected image file and/or video stream that corresponds to a selected resource icon 608 may be processed in response to user input corresponding to operations illustrated in operation bar 610. Selection window 606 may be a user interface presented by any of applications 403 illustrated in FIGS. 4*a*-*d* and/or by network application agent 405*b*. For example, selection window 606 may be presented via interoperation of browser 403*b*, network application agent 405*b*, and/or network application 403*d*. A browser window may include a user interface of a network application provided by a remote node, such as a network application 403*d* in FIG. 4*d*.

Various UI elements of applications 403 described above may be presented by one or more UI element handler components 433 in FIGS. 4*a*-*c* and/or by one or more template engines 423*d* in FIG. 4*d*. In an aspect, illustrated in FIGS. 4*a*-4*c*, UI element handler component(s) 433 of one or more applications 403 is/are configured to send presentation information representing a visual interface element, such as operation bar 610 in FIG. 6, to a GUI subsystem 437. A GUI subsystem 437 may instruct a graphics subsystem 439 to draw the visual interface element in a region of display presentation space 602, based on presentation information received from a corresponding UI element handler component 433.

Input may be received corresponding to a UI element via an input driver 441 illustrated in FIGS. 4*a*-*c* in various adaptations. For example, a user may move a mouse to move a pointer presented in a display presentation space 602 over an operation user interface element presented in an operation bar 610. A user may provide an input detected by the mouse. The detected input may be received by a GUI subsystem 437 via an input driver 441 as an operation or command indicator based on the association of the shared location of the pointer and the operation user interface element in display presentation space 602.

With reference to FIG. 2, block 202 illustrates that the method includes receiving resource information identifying a first resource and a second resource for processing by a program component. Accordingly, a system for selecting a resource based on a measure of a processing cost includes means for receiving resource information identifying a first resource and a second resource for processing by a program component. For example, as illustrated in FIG. 3, cost advisor component 302 is configured for receiving resource information identifying a first resource and a second resource for processing by a program component. FIGS. 4*a*-*d* illustrate cost advisor components 402 as adaptations and/or analogs of cost advisor component 302 in FIG. 3. One or more cost advisor components 402 operate an in execution environment 401.

In FIG. 4*a*, cost advisor component 402*a* is illustrated as a component of application 403*a*. In FIG. 4*b*, cost advisor component 402*b* is illustrated as component of network application agent 405*b* and/or browser 403*b*. In FIG. 4*c*, cost advisor component 402c is illustrated operating external to one or more applications 403c. Execution environment 401c includes cost advisor component 402c in cost management subsystem 407c. In FIG. 4d, cost advisor component 402d is illustrated operating in network application 403d remote from a display device for presenting received information for updating a visual component. For example, cost advisor component 402d may operate in remote application provider node 506 while the received information is to be sent to a display device of user node 502 via network 504.

Receiving resource information identifying a resource may include receiving an indication to present a representation of the resource to a user via an output device, receiving an indication identifying the resource as an input to a program component in an execution environment for performing an operation that includes processing the resource, detecting an access to the resource for the processing by a program component, detecting an input corresponding to a user interface element including a representation of the resource, sending information to present a representation of the resource to a user via an output device, and/or intercepting a communication for accessing the resource. In response to one or more of these and/or analogous events, a cost advisor component 402 in FIG. 4a-d may receive resource information identifying a resource.

In an aspect, resource information identifying a second resource may be received. In response to receiving the resource information the first resource may be identified. The second resource may be identified as an alternative to processing the first resource or as an additional resource to process along with the first resource based on a measure of a processing cost determined for one or both resources.

FIGS. 4a-c illustrate that a cost advisor 402 may interoperate with a user interface component, such as a user interface element handler component 433. The user interface component may present a representation of a resource for selecting by a user as an input to a program component for performing an operation. For example, a selectable representation of a resource may be presented in an explorer or navigation window, a list box, a spinner, a text input box, a file selection dialog, and/or any other user interface component for selecting an item by a user. The presentation may be via audio output with selection via a voice input device and/or other input device(s). Resource icons 608 in FIG. 6 presented, based on received resource information, may illustrate selectable representations of one or more resources. Exemplary resources for processing by a program component include some or all of a data file, an executable file, a database record, a network message, input data, output data, a document, a media stream, a digital image, a communication communicated between at least two communicants, and/or a log.

In an aspect, a resource icon 608 in FIG. 6 may represent an image and/or a video to be processed by a program component, such as application 403a in FIG. 4a, for presenting as a background of a display region, such as a desktop or an application background. Cost advisor component 402a may present a file navigation user interface to receive resource information identifying one or more images and/or videos for processing by an IPU and/or other hardware component(s) included in execution environment 401a as an input to application 403a for performing the operation of presenting a desktop background.

In FIG. 4c, GUI subsystem 437c may receive resource information identifying an image and/or video to present in display presentation space 602 as desktop background 604. GUI subsystem 437c may interoperate with cost advisor component 402b to communicate resource information identifying a resource.

Network application agent 405b in FIG. 4b and/or network application 403d in FIG. 4d may receive resource information for presenting and/or otherwise processing by network application agent 405b and/or browser 403b. For example, cost advisor component 402b may be provided with resource information and/or cost advisor component 402d may be provided with resource information. Cost advisor component 402b and cost advisor component 402d may interoperate in an aspect. In another aspect, cost advisor component 402b and cost advisor component 402d may operate independently. In still another aspect, one or the other of cost advisor component 402b and cost advisor component 402d may not be included in an adaptation of one or the other of execution environment 401b and execution environment 401d.

In various aspects and adaptations of cost advisor 302 in FIG. 3, such as cost advisors 402 in FIGS. 4a-d, a cost advisor may be included in accessing and/or otherwise managing a resource. The cost advisor may receive resource information in response to an access to the resource. Resource information may be received through an invocation of a cost advisor 402 as a function, method, subroutine, and the like. The resource information may be received via a notification associated with a subscription to events associated with the resource and/or a program component for processing the resource. The resource information may be received via an interprocess communication mechanism (IPC) such as a message queue, a pipe, a software interrupt, and/or a hardware interrupt. The resource information may be received via a message received via a network.

Alternatively or additionally, resource information may be received in response to identifying a program component. A program component may process resources having a particular attribute, such as file type and/or content type. For example, application 403a in FIG. 4a may include a media player component to process files having file types and/or having content type identifiers that identify the media files including audio data, image data, and associated metadata. Resource information for one or more resources that match attribute information that identifies the resources as inputs for processing by a program component, may be received by cost advisor component 402a in response to receiving information identifying the media player component (not shown).

A second resource may be identified based on the first resource. In one aspect, a program component may process resources having a particular attribute, such as file type and/or content type. For example, a drawing program component may process files having file types and/or content type identifiers that identify the files that are computer drawn and/or editable via drawing. Resource information for one or more resources that match attribute information for an identified first resource may be received, in response to and/or otherwise based on identifying the first resource for processing and/or during processing by a program component. For example, in FIG. 4c application 403c1 may be a graphics editing application. Application 403c1 may access a first resource having a file type and/or other content type identifier indicating that it includes editable graphics content. Cost advisor 402c may receive information identifying one or more other resources including editable graphics content in response to application 403c1 accessing the first resource.

Returning to FIG. 2, block 204 illustrates that the method further includes determining at least one of a first measure of a specified processing cost for the processing of the first resource and a second measure of the processing cost for the processing of the second resource. Accordingly, a system for selecting a resource based on a measure of a processing cost includes means for determining at least one of a first measure of a specified processing cost for the processing of the first resource and a second measure of the processing cost for the processing of the second resource. For example, as illustrated in FIG. 3, cost monitor component 304 is configured for determining at least one of a first measure of a specified processing cost for the processing of the first resource and a second measure of the processing cost for the processing of the second resource. FIGS. 4a-d illustrate cost monitor components 404 as adaptations and/or analogs of cost monitor component 304 in FIG. 3. One or more cost monitor components 404 operate in an execution environment 401.

A metric defines a unit of measure. For example, an "inch" is a unit of measure for measuring length. A "kilowatt-hour" (kWh) is a unit of measurement in a metric for measuring an amount of energy. Instead of or in addition to measuring an amount a metric may measure a rate. "Kilowatts per hour" (kWh/h) is energy or power metric for measuring a rate of energy used. A "measure" is a result of a particular measuring or measurement process. For example, 3 inches is a measure according to the length metric for inches, and 1000 kWh is a measure of an energy metric identifying an amount of energy. As used herein, a "measure of a processing cost" refers to a result of a measuring process for determining a processing cost according to a specified metric. Measuring may include estimating a measurement.

A processing cost may be determined and/or expressed by any metric, directly and/or indirectly providing an indication of a processing cost associated with processing a resource in performing a specified operation. A metric for determining a processing cost in terms of electrical power may be determined by monitoring a rate of electrical energy utilized over time period by a hardware component that is included in processing a resource. For example, a flow of electricity to a network interface adapter may be monitored, for resources where processing the resources includes sending and/or receiving data via a network. Some of the data may be included in the resources. The metric may represent the cost, for example, in kilowatt-hours, in kilowatts per hour, in transmission time, in bandwidth utilization, in latency, and/or in monetary units. In FIGS. 4a-d, cost monitor component 404 may be invoked to determine and/or otherwise identify a measure of a processing cost for processing a particular resource in performing an operation.

A metric may be specified for measuring and/or expressing a processing cost in a less direct manner. For example, with respect to energy cost, an energy cost may be measured by counting occurrences of an energy consuming activity, such as a disk read. From another perspective a metric based on disk reads may be a direct measure of a utilization cost resulting from processing one or more resources stored in a hard-drive.

Exemplary metrics for measuring processing cost include metrics for energy, monetary metrics, time metrics, kinetic or stored energy metrics, heat metrics, metrics for resistance including mechanical and/or electrical resistance, metrics for measuring various energy and/or power consuming activities, metrics for measuring an environmental cost, health metrics, safety metrics, light metrics, metrics for measuring movement, metrics for measuring mass and/or weight, and/or metrics for measuring an opportunity cost.

A particular metric for determining a measure of a processing cost for a resource may be selected and/or otherwise identified based on one or more attributes of a resource, an operation that includes processing the resource, a program component for performing some or all of the operation, a hardware component included in processing the resource, a user, an organization, and/or a task; to name a few examples. For example, a metric such as a count of machine code instructions executed by an IPU may be specified and/or determined in performing a specified operation. An IPU based metric may be selected for measuring a cost of processing a resource where no output device is included in processing the resource. For an application or process that presents a user interface via a display component, a metric for measuring heat and/or light generated by the display device may be specified.

A cost monitor component 404, in an aspect, may determine a measure of a processing cost based on metadata provided in and/or with one or more of a resource, a program component for performing an operation that includes processing the resource, and a hardware component included in performing an operation that includes processing the resource. A measure of a processing cost may be predetermined and located by cost monitor component 404 in and/or associated with a resource, a program component, and/or a hardware component. Cost monitor component 404 may access a table and/or other structure including predefined values for measures of the processing cost for a particular metric such as a change in temperature of a hardware component in Celsius and/or a time based cost represented in US dollars.

A cost monitor component 404 may look up and/or may otherwise identify a predefined value based on a type of a resource, a size of a resource, an energy source, a hardware component, and/or a program component for processing the resource. The predefined value may be a measure of a processing cost and/or may be an input for determining a measure of a processing cost expressed according to an identified metric. For example, a predefined value may be multiplied by a measure of time that a resource may be processed by a program component to produce a time based metric such as disk reads per minute.

In another aspect, a cost monitor component 404 may determine a measure of a processing cost by calculating the measure according to the specified metric and/or may interoperate with a sensor, such as a thermometer, in measuring a cost of processing. Cost monitor component 404 may include and/or otherwise access one or more measurement components for determining a measure according to one or more metrics.

In FIG. 4a, cost monitor component 404a is illustrated operating in application 403a. Cost monitor component 404a may determine a measure of a processing cost for resources processed by application 403a. The resources may include resources provided by application 403a to other applications, subsystems, and/or components operating in execution environment 401a and/or in another execution environment included in and/or otherwise provided by one or more devices.

For example, application 403a may present selection window 606 in FIG. 6. The resources processed by application 403a may include data, represented by resource icons 608, to send to another node. Cost monitor component 404a may determine a measure of a processing cost for transmitting the data to the other node via a particular physical network media physically coupled to a network adapter in execution environment 401a. Cost monitor component 404a may be configured with and/or otherwise may determine a measure based on a count of bytes in the resources and/or in an encoded translation of the resource(s) for transmitting.

In FIG. 4b, cost monitor component 404b is illustrated operating at least partially in network application agent 405b. Some or all of network application agent 405b may be received by browser 403b, operating in user node 502 in FIG. 5, from network application 403d in FIG. 4d operating in application provider node 506 in FIG. 5 as described above. FIG. 4d illustrates cost monitor component 404d operating in network application 403d. Cost monitor component 404b and/or cost monitor component 404d may determine a measure of a processing cost for resources processed by network application 403d and/or network application agent 405b. Cost monitor component 404b and/or cost monitor component 404d may be components in a cost monitor system distributed between network application agent 405b and network application 403d. Cost monitor component 404b and/or cost monitor component 404d may operate independently. Operating independently may include one of the cost monitor components operating in the absence of the other cost monitor component. Resources may include resources provided by network application agent 405b to browser 403b and/or extensions of browser 403b. The resources may further include resources provided to other nodes in network 504 by network application agent 405b and/or network application 403d. Network application agent 405b may interoperate with browser 403b to present selection window 606 in FIG. 6 in a browser window or tab (not shown). The resources processed may be represented by resource icons 608.

Cost monitor component 404b and/or cost monitor component 404d may determine a measure of a processing cost for processing one or more resources where processing the resources includes transmitting the resources via network 504 in FIG. 5. Transmitting resource data may include encoding, decoding, filtering, translating, and/or transforming some or all of the data in a resource in some manner. For example, a resource may be compressed prior to transmitting via network 504. Cost monitor component 404b may determine a metric based on a type of physical layer network included in network 504, may determine a metric based on an encoding, decoding, and/or other transformation, may determine a metric based on a manufacturer and/or type of network interface component, and/or may determine a metric based on network throughput data and/or other network attributes and/or metadata. The measure may be a cost for transmitting a web document via a network including a modem, a cost for retrieving image data in the web document from a hard drive, a cost for decoding data received via network 504, and/or a cost for transmitting data over a secure network connection. Cost monitor component 404b and/or cost monitor component 404d may be configured with and/or otherwise may identify a predefined measure of a processing cost according to a metric selected by a developer of browser 403b and/or based on version information for browser 403b.

In FIG. 4c, cost monitor component 404c is illustrated operating in cost management subsystem 407c. Cost management subsystem 407c may be a subsystem of execution environment 401c that provides services to a number of program components operating in execution environment 401c and/or in another execution environment communicatively coupled to a network 504 in FIG. 5. Cost monitor component 404c may determine measures of a processing cost(s) for various resources processed by various applications 403c operating in execution environment 401c. The resources may include resources provided to and/or otherwise accessible to applications 403c via various subsystems of execution environment 401c, such as a file system (not shown) and/or network stack 411c.

For example, selection window 606 in FIG. 6 may be presented as a document navigation window presented by execution environment 401c. "Op1" presented in operation bar 610 may invoke first application 403c1 for processing a currently selected resource, illustrated as resource icon 6082b. "Op2" in operation bar 610 may be a user interface control for invoking second application 403c2 for one or more selected resources represented by resource icons 608. Resources processed by first application 403c1 may include documents having various content types. Cost monitor component 404c may determine a measure of a processing cost for the documents expressed by a metric based on the format of the respective documents identified by a content type and based on an operation for processing the documents. The operation may be performed by application 403c1 and/or may be performed by one or more other components.

For example, for a particular device a file system operation may be configured to be an operation for determining a measure of a processing cost for a resource processed by first application 403c1. In FIG. 4c, cost management subsystem 407c may determine processing costs for resources, freeing applications 403c from determining processing costs. Note that, in an aspect, at least some of cost management subsystem 407c may operate in a node other than the node included in and/or providing execution environment 401c. For example, some or all of the arrangement of components may be adapted to operate in execution environment 401d, which includes and/or is otherwise provided by application provider node 506.

Cost monitor component 404a is illustrated operating in application 403a. Cost monitor component 404a may determine a measure of a processing cost for resources processed by application 403a. Application 403a is a program component and may include one or more program components. The resources may include resources provided by application 403a to other applications, subsystems, and/or components operating in execution environment 401a and/or in another execution environment included in and/or otherwise provided by one or more devices. For example, application 403a may present selection window 606 in FIG. 6. The resources processed by application 403a may include images and videos represented by background resource icons 608. Cost monitor component 404a may determine a measure of a processing cost for presenting the images and/or videos as desktop backgrounds. For example, cost monitor component 404a may be configured with and/or otherwise may determine a measure based on a count of display refreshes over a specified period of time for the various resources to determine a measure of a processing cost for presenting the various respective resources.

Returning to FIG. 2, block 206 illustrates that the method yet further includes selecting one of the first resource and the second resource based on the at least one of the first measure and the second measure. Accordingly, a system for selecting a resource based on a measure of a processing cost includes means for selecting one of the first resource and the second resource based on the at least one of the first measure and the second measure. For example, as illustrated in FIG. 3, cost director component 306 is configured for selecting one of the first resource and the second resource based on the at least one of the first measure and the second measure. FIGS. 4a-d illustrate cost director components 406 as adaptations and/or analogs of cost director component 306 in FIG. 3. One or more cost director components 406 operate in an execution environment 401.

In an aspect, a resource may be selected and/or otherwise identified based on selection information received in response to a user input detected by an input device and based on a measure of a processing cost. The measure and/or an indication based on the measure may be presented for respective resources for processing by a particular program component. For example, a user may open and/or otherwise initiate operation of an application 403a in FIG. 4a. Application 403a may present, in selection window 606 in FIG. 6, a user interface for selecting one or more resources from multiple resources for processing by the application. For example, cost director component 406a in FIG. 4a may send presentation information to present a cost indication for the one or more resources presented in selection window 606 in FIG. 6, allowing a user to select a resource represented by a particular resource icon 608 from the resources represented by respective resource icons. Selection input from a user identifying a resource represented by the particular icon may be received and/or otherwise selected based on a cost indication presented for the resource. The cost indication is based on a measure of a processing cost for the resource.

A user input selecting a resource for processing by the application may be detected by a UI element handler 433a for the selection user interface and/or for the representation of the resource. In an aspect, cost director component 406a may determine whether to send presentation information to present a cost indication for a resource based on a cost condition, such as an energy condition. For example, cost monitor component 404a may evaluate a specified energy condition based on a determined measure of a processing cost for a resource. When the energy condition is met, cost director component 406a interoperating with cost monitor component 404a may select one or more resources for processing and send presentation information for presenting the resource in the selection user interface. When the condition is not met, the resource is not selected for presenting. Thus a selectable representation of a resource may be a cost indication based on a measure of a cost of processing. In the aspect, only resources that meet a particular energy condition may be selected. For example, in FIG. 6 normally presented resource icons 608 may be presented as selectable as directed by cost director component 406. Pattern icons such as icon 608 mb may be presented as non-selectable by cost director component 406, so that user input corresponding to icon 608 mb is not processed as a selection of the resource as analogous input for normally presented icons is processed as a selection.

FIG. 6 also illustrates presenting a cost indication based on a measure of a processing cost for a resource. The measure may be determined based on a metric for measuring a particular cost of processing and presented as a numeric indication based on the measure. Cost indications determined for the respective resources are illustrated by resource icons 608 in FIG. 6. For example, the illustrated indications in FIG. 6 are based on a five-point scale providing relative indications of a processing cost for the respective resources. An indication of "5" may be defined as a cost indication for a most expensive resource or resources for processing according the metric. A "1" indication may indicate resources that require the least cost according to the metric as presented according to the five-point scale. The cost indications may change based on an operation selected in operation bar 610. A resource may be selected for presentation in a region based on a cost indication. A user may select a resource for processing from the presented resource representations based on the presented cost indications.

A region of display presentation space 602 may be designated for presenting a resource having a cost that matches a specified cost condition. For example, higher-cost resources may be placed relatively closer to the bottom of a screen than relatively lower-cost resources. A position in a screen may be a cost indication. In another aspect, an orientation of a UI element representing and/or associated with a resource may be defined as a cost indication based on a specified measure according to a particular metric. Variations in other user detectable attributes may be configured as indications for various metrics in other aspects.

A cost director component 406 may change or otherwise provide for changing a pointing device representation, such as a mouse pointer, when it approaches and/or is in a location of a presented resource, as a cost indication based on a measure according to a particular metric for processing a resource represented by a UI element in the location. For example, different colors of the pointer may be defined as different indications associated with different measures of a processing cost. Alternatively or additionally, a pointer may be deactivated for selecting a resource based on a measure of a processing cost for the resource. In an aspect, a resource may be automatically selected when a cost condition based on a measure of a processing cost is met. Thus automatic selection may be a cost indication.

In FIG. 4d, cost director component 406d in network application 403d may send information via a response to a request and/or via an asynchronous message to a client, such as browser 403b and/or network application agent 405b, to present a user detectable indication of a measure of a processing cost for a resource. One or more resources may be selected for representing. The one or more resources may be selected based on their respective measures and/or corresponding cost indications.

In another aspect, a user input for selecting a resource may be detected. A warning indication may be presented, in response to receiving the selection, when an energy condition, based on a measure of energy for the resource, is not met. A cost director component 406 may direct a UI element handler component 433 to present a warning when cost monitor component 404 determines that an energy condition is not met for the selected resource, based on a determined measure of a processing cost for the resource. The measure of a processing cost may be based on an energy metric.

An indication of a measure of a processing cost for a resource may include presenting a representation of the resource in a plurality of representations of resources according to an order of respective measures of processing costs determined for the resources in the plurality.

Presentation information for presenting a cost indication may be sent in a message via a network to a node operatively coupled to an output device. Cost director component 406d in FIG. 4d operating in application provider node 506 in FIG. 5 may send presentation information in response to a request from network application agent 405b in FIG. 4b operating in user node 502.

A change in a measure of a processing cost associated with a resource being processed and/or change in a measure of a processing cost of an alternative and./or additional resource may be detected. In response to one or more detected changes, an alternative and/or an additional resource may be selected for respectively identifying to a program component instead of and/or in addition to the resource currently being processed.

For example, cost management subsystem 407c in FIG. 4c may monitor a level of energy in a battery providing energy for a handheld device. Cost management subsystem 407c may invoke cost monitor component 404c in response to detecting a battery energy level falling below a specified threshold. Cost monitor component 404c may recalculate and/or otherwise determine a measure of a processing cost for one or more resources in response to the change in battery state. Cost monitor component 404c may provide changed measures of a processing cost to cost director component 406c. Cost director component 406c may select an alternative and/or an additional resource, depending on the change to cost operations component 408c, for identifying to the program component.

In an aspect, an energy condition may be specified. A measure of a processing cost determined for a resource may be determined for evaluating an energy condition to determine whether the energy condition is met. An energy condition may be identified for evaluating and/or may be evaluated based on an energy source, an amount of energy available, an amount of energy available in a battery and/or other energy store, an amount of energy used and/or currently being used for processing another resource, a location of the device, and a time required for restoring an energy store to a specified state, to name a few examples. A location of a device may be a location with respect to another location for charging or changing energy sources.

When an energy condition and/or other cost condition is not met for a resource, a cost director component 406 may select one or more alternative resources to a first resource based on one or more respective measures of a processing cost determined by a corresponding cost monitor component 404. One or more representations of the respective one or more alternative resources may be selected for presenting to a user. A user input may be received from the user for selecting an alternative resource. A user input may be received indicating that the first resource is to be provided to the program component for processing. In yet another alternative, a cost director component 406 may automatically select an alternative resource that meets the energy condition and/or other cost condition for processing instead of the first resource. In an additional aspect, the first resource may meet the energy condition and cost director component 406 may select one or more resources from the alternatives to identify to the program component in addition to the first resource. Cost director component 406 may identify the additional resource(s) automatically or may receive input from a user to identify one or more additional resources.

Also as described above, a resource may be selected automatically, based on a measure of a processing cost for the resource, by a cost director component 406. Cost operations component 408 may access the resource, transform the resource into a format suitable for processing by the program component, and/or otherwise identify the resource to the program component for processing.

Returning to FIG. 2, block 208 illustrates that the method yet further includes identifying, to the program component, the selected one of the first resource and the second resource for processing. Accordingly, a system for selecting a resource based on a measure of a processing cost includes means for identifying, to the program component, the selected one of the first resource and the second resource for processing. For example, as illustrated in FIG. 3, cost operations component 308 is configured for identifying, to the program component, the selected one of the first resource and the second resource for processing. FIGS. 4a-d illustrate cost operations components 408 as adaptations and/or analogs of cost operations component 308 in FIG. 3. One or more cost operations components 408 operate in an execution environment 401.

As described above, resources may be selected, based on a measure of a processing cost, in response to detecting a user input for selecting the resource. Selection information may be received by a UI element handler component 433 for a selectable representation of a resource. The UI element handler component 433 receiving the selection information may provide and/or otherwise identify the resource to cost operations component 408. Cost operations component 408 may access the resource, transform the resource into a format suitable for processing by the program component, and/or identify the resource to the program component for processing.

In FIG. 4a, cost operations component 408a may identify a resource selected based on a measure of a processing cost to any one or more components in application 403a. In FIG. 4b and in FIG. 4d, cost operations component 408b and/or cost operations component 408d may identify a resource selected based on a measure of a processing cost to any one or more components in browser 403b, network application agent 405b, and/or to network application 403d in FIG. 4d. Cost operations component 408b and cost operations component 408d may operate alone without the presence of the other, may operate independently while the other is operating, or may interoperate to identify the selected resource in various aspects. In FIG. 4c, cost operations component 408c may identify a resource selected based on a measure of a processing cost to any of one or more program components including various applications 403c. Alternatively or additionally, cost operations component 408c may identify a resource selected based on a measure of a processing cost to a program component operating in another execution environment including and/or otherwise provided by another node.

Also as described above, a resource may be identified automatically, in response to being selected. A cost operations component 408 may access the resource, transform the resource into a format suitable for processing by the program component, and/or otherwise identify the resource to the program component for processing.

A program component may be performing an operation that includes processing a first resource. A second resource selected based on a measure of a processing cost may be identified to the program component to perform the operation instead of the first resource. For example, application 403a in FIG. 4a operating in a user device, such as user node 502 in FIG. 5, may present a resource as desktop background 604 in FIG. 6. When user node 502 is operating on a battery with an estimated energy available exceeding a specified time threshold, such as one hour, cost operations component 408a may select a video resource to present in display presentation space 602 as desktop background 604 based on a measure of a processing cost determined for the video resource. When user node 502 is operating on a battery with an estimated energy available less than a specified time threshold, such as one hour, cost operations component 408a may select a still image resource to present in display presentation space 602 as desktop background 604 where a measure of a processing cost for the still image meets an energy condition based on the energy available in the battery and the video does not meet the condition.

In another aspect, a program component may be performing an operation that includes processing a first resource. A second resource selected based on a measure of a processing cost may be identified to the program component to perform the operation in addition to performing the operation including processing the first resource. For example, network application agent 405b in FIG. 4b operating in user node 502 may upload files to network application 403d operating in application provider node 506 via network 504. When network 504 is an intranet in a home or business with no monetary charge based on bandwidth utilization, a measure of processing cost based on a metric for measuring the monetary cost of bandwidth may be zero or near zero for resources to transfer from user node 502 to application provider node 506. A user may select a first resource for upload. Based on the bandwidth cost, cost operations component 408b may identify an additional resource to transmit, in parallel with the first resource, from user node 502 to application provider node 506 to transfer. Alternatively or additionally, cost operations component 408d may send a matching criterion to identify one or more additional resources to receive in parallel with the first resource from network application agent 405b operating in browser 403b.

As described herein, a resource may be selected based on a measure of a processing cost. At some time after the selection, the resource may be identified to a program component in response to detecting a specified event. A number of resources may be selected based on respective measures of a processing cost. The resources may be associated with a number of respective events. In response to a first event in the number of events, a first resource associated with the first event may be identified to a program component. In FIG. 4c, cost management subsystem 407c may change permissions, roles, etc. for selected resources based on measures of a processing cost allowing access to and/or otherwise identifying resources that match a current cost condition.

The method illustrated in FIG. 2 may include additional aspects supported by various adaptations and/or analogs of the arrangement of components in FIG. 3. Receiving resource information identifying a resource may include intercepting a communication for performing an operation, detecting an access for retrieving the resource, reading a message recording at least one of an access to the resource and a request for performing an operation, identifying a mapping identifying the type of the resource and an operation, and/or detecting a change in a program component for performing an operation, a change in the resource, and a change in a hardware component included in processing the resource. A cost advisor component 402 in FIGS. 4a-d may be configured to interoperate with various components, to receive resource information, including a file system, a data store, a data storage device, a GUI subsystem 437, an input driver 441, a network stack 411, and an application protocol component 413, to name a few examples.

Receiving resource information may include receiving a communication, intercepting a communication, and/or initiating a communication. Receiving the resource information may include detecting an access to at least one of the first resource, the second resource, and the program component. Detecting an access may include detecting an access to at least one of a semaphore, a lock, a data storage location, a component of a input subsystem, a component of a presentation subsystem, a storage subsystem, a component of a networking subsystem, a component of a graphics subsystem, a component of an audio subsystem, a display adapter, a display device, an audio adapter, an audio output device, a tactile presentation subsystem, a tactile output device, an access control component, a serialization component, a synchronization component, a thread, an input device driver, an input device, another application, a code library, a database, a service operating in remote node via a network, text data, image data, audio data, tactile data, a message formatted according to a communication protocol, a service, a presence entity, a subscription, a software component, a hardware component, a transaction, a media stream, a location, a measuring device, data, an instruction, a persistently stored resource, a resource stored in volatile storage, a network resource, a preexisting resource, a dynamically generated resource which may already exist, a service for generating the resource, a font, an encoding, a format, a mechanical resource, and an optical resource.

Image data may include a still image, a video, a background image, and/or an image for representing another resource. Audio data may include a song, a voice message, and/or a sound for indicating an event.

Exemplary hardware components that may be included in processing a resource include an IPU, an output device, a storage device, an input device, a networking component, a bus, a physical processor memory, and/or a switching fabric.

A metric may be selected based on a resource, an operation, a hardware component, the program component, a user, a group, a role, a task, a time, a location, and/or a device for performing the operation and/or for providing the resource. A metric for measuring a processing cost for a resource may be based on at least one of the resource, an operation included in processing the resource, a hardware component included in performing an operation that includes processing the resource, a user, a group, a role, a task, a time, a location, and hardware for providing and/or otherwise maintaining the resource. For example, a cost monitor component 404 may monitor a rate of energy received by a display device for an image resource presented and/or to be presented by the display device. A cost monitor component 404 may determine a measure of a processing cost according to a metric based on a count of bytes in a file resource for transmitting a resource via a network.

Various aspects and adaptations of cost monitor component 304 in FIG. 3 may determine a measure of a processing cost for a metric based on a flow of electricity, stored energy, mechanical resistance, electrical resistance, time, a count of a particular energy related event, money, an environmental impact, a health impact, a change in size, a change in mass and/or weight, a safety impact, heat, light, and/or movement. Correspondingly, various aspects and adaptations of cost monitor component 304 may determine a measure of electrical energy, a measure of stored energy, a measure of mechanical resistance, a measure of electrical resistance, a measure of time, a count of a particular event, a measure of monetary cost, a measure of heat, a measure of light, a measure of distance, a measure of mass, a measure of size, and/or a measure of weight.

A processing cost may be based on a flow of electricity, stored energy, mechanical resistance, electrical resistance, time, a count of a particular event, money, a size, mass, weight, heat, light, and/or movement. A first measure and a second measure may include a measure of electrical energy, a measure of stored energy, a measure of mechanical resistance, a measure of electrical resistance, a measure of time, a count of a particular event, a measure of monetary cost, a measure of heat, a measure of light, a measure of distance, a measure of mass, a measure of size, and/or a measure of weight. A count may be based on IPU cycles, disk spins, data read operations, data write operations, refreshes of at least a portion of a presentation space, display refreshes, data transmitted via a network, data received via a network, and/or human movement. A measure of human movement may be based on a measure of dispersion of key presses; a pattern and frequency of movement of a tracking device; and a count of at least one of key presses, squeezes, pushes, pulls, changes between lower case and upper case, and/or a count of numerical digits.

A measure of a processing cost may be determined based on a previously determined measure of a processing cost. Determining a measure may be based on locating a predefined measure based on at least one of the resource and the program component.

Determining a measure may include sending a message via a network to a node for determining the measure. A response may be received via the network including and/or otherwise identifying the measure.

In an aspect, an energy condition may be specified. A measure of a processing cost determined for a resource may be determined for evaluating an energy condition to determine whether the energy condition is met. An energy condition may be identified for evaluating and/or may be evaluated based on an energy source, an amount of energy available, an amount of energy available in a battery and/or other energy store, an amount and/or rate of energy used and/or currently being used for processing another resource, a location of the device, and a time required for restoring an energy store to a specified state, to name a few examples.

In response to determining whether an energy condition is met for a resource, a representation of the resource presented by an output device may be presented as user selectable or not user selectable. For example, in FIG. 4c when an amount of energy available from a battery in a mobile device falls below a specified threshold, files over a specified size may not be presented or may be presented but not selectable for attaching to an email by an email application represented by second application 403c2. In FIG. 4b and in FIG. 4d, one or both of cost monitor component 404b and cost monitor component 404d may receive information identifying a monetary cost of transmitting data via a current network access provider. Based on the cost, certain resources may be presented as selectable for certain operations including transmitting data in the resources and may be presented as not selectable for other network operations based on one or more cost conditions associated with the operations, the program components, and/or the resources. A first resource may be selected for presenting as user selectable, and a second resource may be not be presented or may be presented as un-selectable.

A resource may be selected from a plurality of resources in response to user selection information. For example, a first selectable representation of a first resource and a second selectable representation of a second resource may be presented to a user based on respective measures of a processing cost. Selection information may be received in response to a detected user input identifying a resource to be selected from the plurality.

A selected resource may be identified to a program component for processing instead of a resource currently being processed by the program component. A selected resource may be identified to a program component for processing in addition to a resource currently being processed by the program component.

A resource may be identified to a program component by disabling access to other resources and allowing access to the resource identifying the resource to the program component. A cost operations component 408 in FIGS. 4a-d may be configured to enable and/or disable access to resources selected by a corresponding cost director component 406.

Identifying a selected resource to a program component may include providing for terminating processing of a resource currently being processed by the program component. Terminating processing of the resource may include terminating processing of the program component. Subsequently, processing of the selected resource by the program component may be initiated. Initiating processing of the selected program component may include initiating and/or restarting operation of the program component. For example, cost operations component 408c in FIG. 4c may restart application 403c1 identifying a selected resource for processing by restarted application 403c1.

In an example, a first resource may include first image data, the second resource may include second image data, and the program component may be configured to present image data in a presentation space of a display allocated for presenting a desktop image. An energy condition may be detected during presentation of the first image data in the presentation space by the program component. The second resource may be selected based on a first measure of a processing cost for the first resource and a second measure of the processing cost for the second resource. The selection may be in response to detecting the condition. In response to the selection, the second resource may be identified to the program component to present the second image data in the presentation space.

In various aspects of the method illustrated in FIG. 2, at least one of receiving the resource information, determining at least one of the first measure and the second measure, selecting one of the first resource and the second resource, and identifying the selected one of the first resource and the second resource may be performed in response to at least one of detecting a change in a first energy source, receiving energy from a first energy source then receiving energy from a second energy source, detecting that energy is flowing to a first source increasing the amount of energy stored in the first source, and detecting a change in an amount of energy available from a first energy source. For example, cost management subsystem 407c in FIG. 4c may detect a change in receiving energy from an electrical outlet to receiving energy from a battery in execution environment 401c. In response to detecting the change, cost director component 406c may select a resource based on a measure of a processing cost. In response to detecting the change, cost operations component 408c may identify a selected resource to a program component for processing.

In various aspects of the method illustrated in FIG. 2, at least one of receiving the resource information, determining at least one of the first measure and the second measure, selecting one of the first resource and the second resource, and identifying the selected one of the first resource and the second resource may be performed in response to a change in at least one of a monetary cost of energy, an organization providing energy, a rate of energy utilization, a utilization time of a first energy source, a user, a geospatial location, heat, light, and a component for at least one of storing, transmitting, and receiving energy. For example, in FIG. 4c, a cost management subsystem 407c may receive event information identifying one or more of listed events and/or conditions in directing performance of the method illustrated in FIG. 2 by the arrangement of components illustrated in FIG. 4c.

In another example, cost director component 406a in FIG. 4a may detect a change in an amount of energy. In an aspect, energy may be flowing from a first energy source to one or more hardware components. Subsequently, energy may be detected flowing to the first energy source. Cost director component 406a may select a resource from a plurality of resources based on a measure of a processing cost for one or more of the respective resources in the plurality. Alternatively or additionally, cost operations director component 408a may identify a selected resource to a program component for processing in response to detecting a change in energy received from an energy source.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer readable medium and execute the instructions for carrying out the described methods. A non-exhaustive list of conventional exemplary computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method for selecting a resource based on a measure of a processing cost, the method comprising:
   identifying a first resource for processing as a first input by a program component and identifying a second resource for processing as a second input by the program component;
   determining a first measure of a specified processing cost for the processing of the first resource by the program component and a second measure of the processing cost for the processing of the second resource by the program component;
   selecting one of the first resource and the second resource based on the first measure and the second measure; and
   identifying, to the program component, the selected one of the first resource as the first input and the second resource as the second input for processing by the program component;
   wherein performing at least one of the preceding actions comprising the method includes execution of an instruction by a processor.

2. The method of claim 1 wherein at least one of the first resource is identified based on a content type of the first resource and the second resource is identified in response to processing the first resource by the program component.

3. The method of claim 1 wherein the at least one of the first measure and the second measure includes at least one of a measure of electrical power, a measure of electrical energy, a measure of stored energy, a measure of mechanical resistance, a measure of electrical resistance, a measure of time, a count of a particular event, a measure of a monetary cost, a measure of heat, a measure of light, a measure of distance, a measure of mass, a measure of size, and a measure of weight.

4. The method of claim 1 wherein a metric for measuring the processing cost is determined based on at least one of the first resource, the second resource, an operation, a hardware component, the program component, a user, a group, a role, a task, a time, a location, a device for performing the operation, and a device for providing the resource.

5. The method of claim 1 wherein at least one of the first measure and the second measure is determined in response to a user input for measuring the processing cost.

6. The method of claim 1 wherein determining at least one of the first measure and the second measure is based on a previous determination of a measure of a processing cost.

7. The method of claim 1 wherein determining at least one of the first measure and the second measure is based on locating a predefined measure based on at least one of the first resource, the second resource, and the program component.

8. The method of claim 1 wherein determining at least one of the first measure and the second measure comprises:
   sending a message via a network to a node for determining at least one of the first measure and the second measure; and
   receiving a response via the network identifying at least one of the first measure and the second measure.

9. The method of claim 1 wherein the selecting comprises:
   comparing the first measure and the second measure; and
   selecting one of the first resource and the second resource based on the comparing.

10. The method of claim 1 wherein in the selecting comprises:
    communicating with an output device to present a first selectable representation of the first resource and a second selectable representation of the second resource to a user;

receiving selection information identifying one of the first resource and the second resource, in response to a detected user input; and selecting the identified resource.

11. The method of claim 1 wherein the selected one of the first resource and the second resource is identified to the program component for processing by the program component instead of the unselected one of the first resource and the second resource currently being processed by the program component.

12. The method of claim 1 wherein the selected one of the first resource and the second resource is identified to the program component for processing by the program component in addition to the unselected one of the first resource and the second resource currently being processed by the program component.

13. The method of claim 1 wherein identifying the selected one of the first resource and the second resource to the program component comprises:

disabling access, for the program component, to the unselected one of the first resource and the second resource; and enabling access, for the program component, to the selected one of the first resource and the second resource.

14. The method of claim 1 wherein identifying the selected one of the first resource and the second resource to the program component comprises:

providing for terminating at least one of the program component and a processing by the program component of an unselected one of the first resource and the second resource; and subsequently at least one of restarting operation of the program component to perform the processing by the program component of the selected one of the first resource and the second resource and starting the processing by the program component of the selected one of the first resource and the second resource.

15. The method of claim 1 wherein at least one of identifying the first resource and the second resource, determining at least one of the first measure and the second measure, selecting the one of first resource and the second resource, and identifying the selected one of the first resource and the second resource is performed in response to at least one of detecting a change in a first energy source, receiving energy from a first energy source then receiving energy from a second energy source, detecting that energy is flowing to a first source increasing the amount of energy stored in the first source, and detecting a change in an amount of energy available from a first energy source.

16. The method of claim 1 wherein at least one of identifying the first resource and the second resource, determining at least one of the first measure and the second measure, selecting the one of the first resource and the second resource, and identifying the selected one of the first resource and the second resource is performed in response to a change in at least one of a monetary cost of energy, an organization providing energy, a rate of energy utilization, a utilization time of a first energy source, a user, a geospatial location, heat, light, and a component for at least one of storing, transmitting, and receiving energy.

17. A system for selecting a resource based on a measure of a processing cost, the system comprising:

a processor, a cost advisor component, a cost monitor component, a cost director component, and a cost operations component, wherein at least one of the cost advisor component, the cost monitor component, the cost director component, and the cost operations component includes an instruction that is executed by the processor during operation of the system;

the cost advisor component for identifying a first resource for processing as a first input by a program component and identifying a second resource for processing as a second input by the program component;

the cost monitor component for determining a first measure of a specified processing cost for the processing of the first resource by the program component and a second measure of the processing cost for the processing of the second resource by the program component;

the cost director component for selecting one of the first resource and the second resource based on the first measure and the second measure; and the cost operations component for identifying, to the program component, the selected one of the first resource as the first input and the second resource as the second input for processing by the program component.

18. A non-transitory computer-readable medium embodying a computer program, executable by a machine, for selecting a resource based on a measure of a processing cost, the computer program comprising executable instructions for:

identifying a first resource for processing as a first input by a program component and identifying a second resource for processing as a second input by the program component;

determining a first measure of a specified processing cost for the processing of the first resource by the program component and a second measure of the processing cost for the processing of the second resource by the program component;

selecting one of the first resource and the second resource based on the first measure and the second measure; and identifying, to the program component, the selected one of the first resource as the first input and the second resource as the second input for processing by the program component.

19. The method of claim 1 wherein the selected one of the first resource and the second resource is included in at least one of video data, image data, audio data, metadata, presentation information, a document, a presentation space, a database record, a network message, a media stream, a digital image, a log, a computer drawing, data for transmitting via a network, data received via a network, a web document, and data processed by a Web browser.

20. The method of claim 1 wherein the selected one of the first resource and the second resource is not at least a portion of the program component.

* * * * *